W. C. WINFIELD & A. C. TAYLOR.
ELECTRIC WELDING MACHINE.
APPLICATION FILED FEB. 17, 1908.
924,868.
Patented June 15, 1909.
2 SHEETS—SHEET 1.
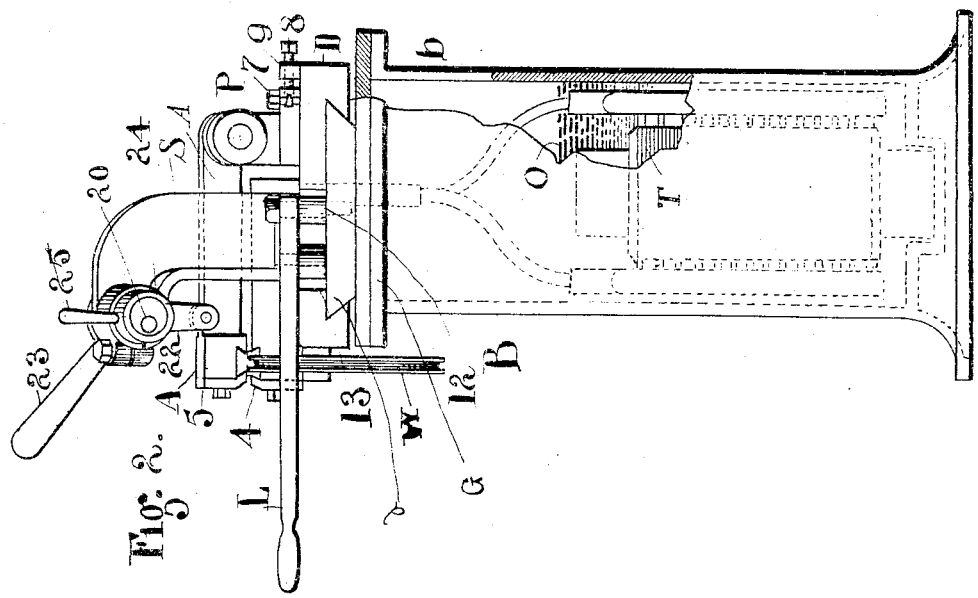
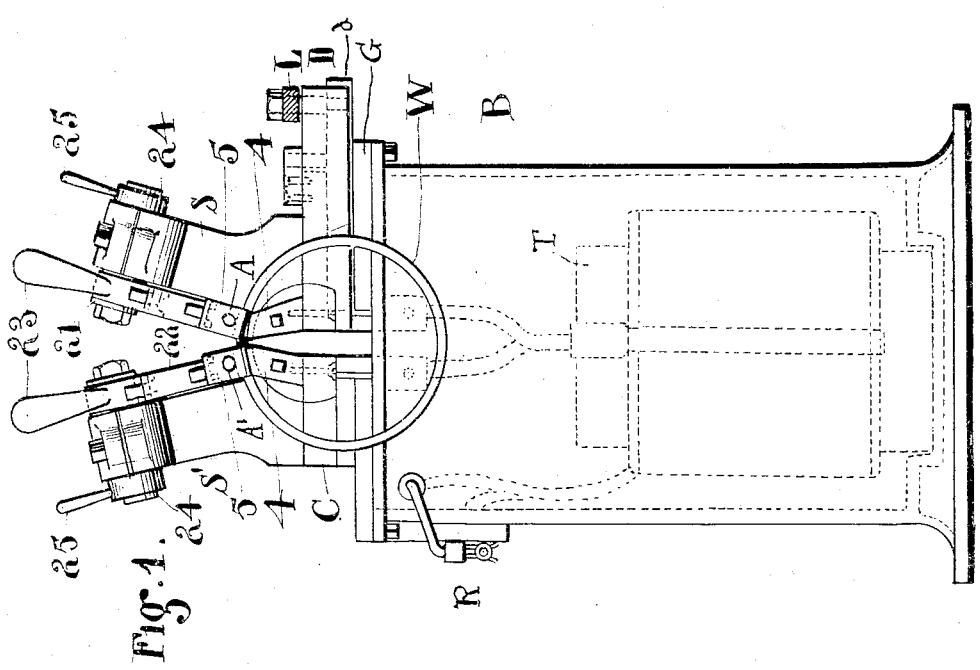
ATTEST
C. M. Fisher
F. C. Musser.
INVENTORS
William C. Winfield
Albertis C. Taylor.
By Fisher & Moser ATTYS.

W. C. WINFIELD & A. C. TAYLOR.
ELECTRIC WELDING MACHINE.
APPLICATION FILED FEB. 17, 1908.

924,868.

Patented June 15, 1909.

2 SHEETS—SHEET 2.

ATTEST
E. M. Fisher
J. C. Newman

INVENTORS.
William C. Winfield.
Albertus C. Taylor.
BY Fisher & Moser ATTYS.

UNITED STATES PATENT OFFICE.

WILLIAM C. WINFIELD AND ALBERTIS C. TAYLOR, OF WARREN, OHIO, ASSIGNORS TO THE WINFIELD MANUFACTURING COMPANY, OF WARREN, OHIO, A CORPORATION.

ELECTRIC-WELDING MACHINE.

No. 924,868.        Specification of Letters Patent.        Patented June 15, 1909.

Application filed February 17, 1908. Serial No. 416,207.

*To all whom it may concern:*

Be it known that we, WILLIAM C. WINFIELD and ALBERTIS C. TAYLOR, citizens of the United States, residing at Warren, in the county of Trumbull and State of Ohio, have invented certain new and useful Improvements in Electric-Welding Machines; and we do declare that the following is a full, clear, and exact description of the invention, which will enable others skilled in the art to which it appertains to make and use the same.

This invention has reference to an electric welding machine, the same being constructed and adapted to operate substantially as shown and described and particularly pointed out in the claims.

Figure 3:
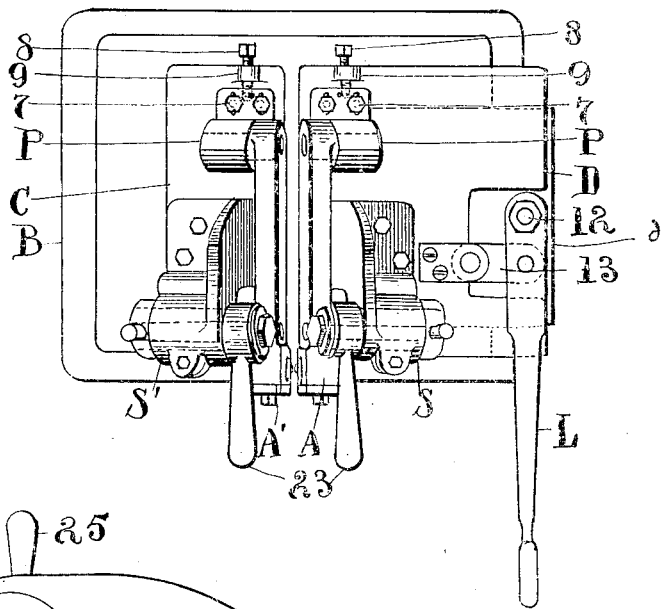
Figure 4:
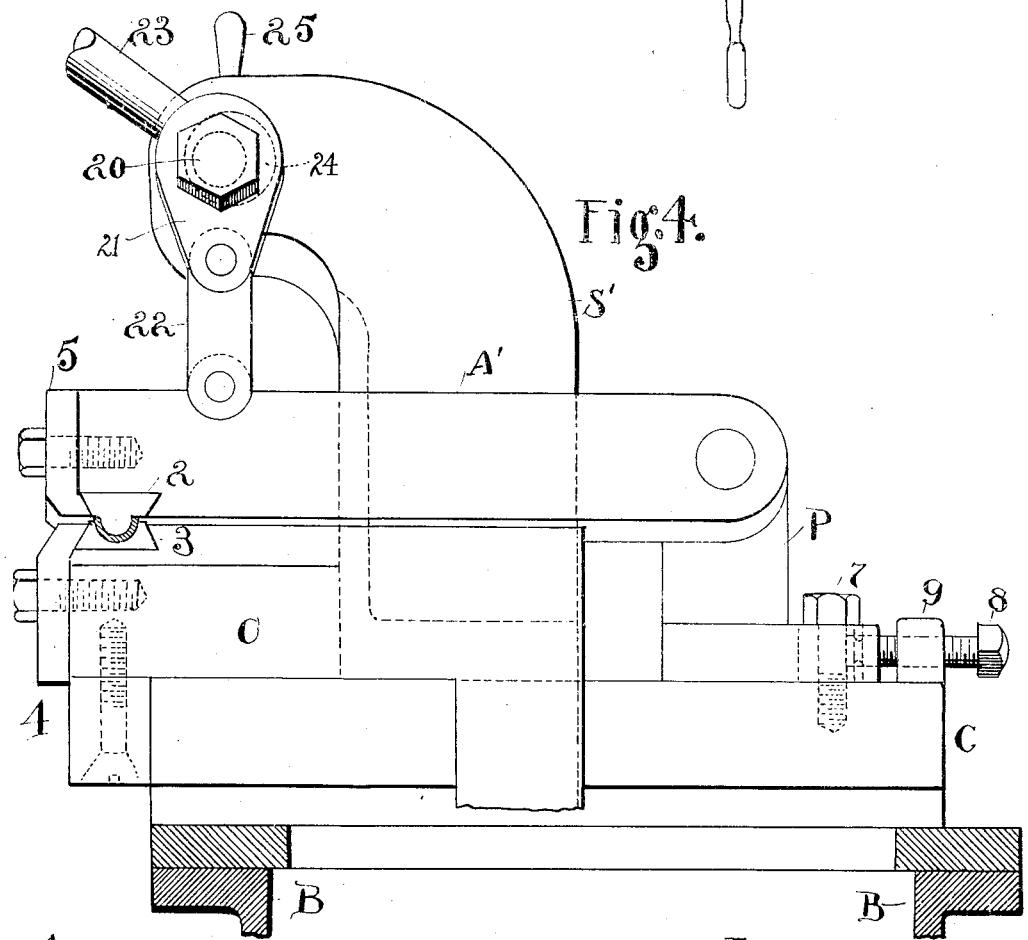

In the accompanying drawings Figure 1 is a front elevation of the machine, and Fig. 2 is a side elevation thereof. Fig. 3 is a plan view, and Fig. 4 is a sectional elevation of the top portion of the machine showing one side or section thereof, as hereinafter fully described.

The machine as thus shown is capable of welding various articles but is especially adapted, in this instance, to weld a form of wheel rim which is concavo-convex in cross section and adapted to be used in light vehicles. By changing the clamping jaws any other form of rim, ring, band, or the like can be welded with equal facility, or, for that matter, stock or work that is straight instead of curved, can also be held and welded on this machine.

B represents the base of the machine, and has a transformer T shown in dotted lines therein, and the operating mechanism is mounted upon this base. The said mechanism comprises two pairs of stock or work engaging jaws 2 and 3, respectively, the jaws 2 being supported each in the bottom and end of one of the pivotally supported arms A and A', and the jaws 3 being fixed in base blocks or tables supported on base B and fixed by clamps 4 at their front. The jaws 2 are held by clamps 5 fixed by screws against the ends of their supporting arms, and said arms are pivotally supported at their outer ends on posts P, made slidably adjustable on their respective base supports C and D. To this end slots are provided in the base flanges of said posts which are engaged by locking screws 7, and adjusting screws 8 are supported in lugs or studs 9 and serve to move said posts when screws 7 are relaxed. The said arms A and A' are thus made adjustable in respect to the work so as to bring upper jaws 2 into exact working position over lower jaws 3 and thereby make the two register exactly with each other and thus assure uniform and even support of the stock between said jaws and a correspondingly even distribution of the current through the stock during the welding operation. The said arms A and A' are operatively supported at their front ends from the standards S and S' respectively, which rest independently upon their own base supports C and D respectively. Thus, the support C is a fixed part on base B and the support or table D is laterally adjustable on a dovetailed projection *d* on base member G beneath table D, so that guiding as well as sliding connection shall be assured between said parts. Operation of the said base support D, which carries standard S, is effected through lever L, pivoted at 12 on base block G and connected by link 13 with sliding support D. The arm A also is mounted on sliding support D along with standard S, and so it follows that said parts have all the lateral movement required to bring the ends of the work W together for welding, and even to press them together more or less firmly when welding is in progress, if this be desired. Prior to this however, the work has been secured in the clamps 2 and 3, and this is accomplished by engaging the ends thereof between the respective sets of jaws 2 and 3 with the extremities projecting through said jaws or clamps relatively about as shown in Fig. 1, and so that there will not be undue exposure thereof out side of the jaws. This also enables the jaws to be disposed in relation substantially as in Fig. 1, wherein they are set apart far enough to introduce a tool upon either side of the weld, or on both, if it be found desirable to apply tools at this point for any purpose before the stock is released from the jaws and while the metal is still soft and tractable. To these ends, also, the standards S and S' are disposed at an outward inclination from each other from the point of engagement of said jaws, and spread apart from each other from this point downward. This affords an open space in the base between said standards which extends into the base proper of the machine. The said base supports C and D also extend forward over the base B relatively as shown in Fig. 4, which brings the jaws 2 and 3 into convenient working position at the front and affords room for the stock or ring to hang as seen in Fig. 1.

The lower jaws are fixed members, and the upper jaws movable members through arms A and A', and such movement is by means of short shafts 20 mounted respectively in the front overhanging heads of standards S and S', and toggle mechanism comprising arms 21 mounted upon the inner ends of said shafts and links 22 connecting said arms with the arms A and A'. Levers 23 are rigid with the heads of arms 21, and thus a separate operating mechanism is provided for the front ends of each of said arms and the jaws 2 thereon, and which serves also to hold said jaws down to work. This action is further controlled or adjusted by means of a sleeve 24, in which shaft 20 is eccentrically mounted, Fig. 2, and said sleeve is controlled by a lever 25 rigid with the end of said sleeve. The eccentricity of shafts 20 is determined by rotating said sleeve. Thus adjustment for more or less pressure is afforded to the upper jaws, and operation through levers 23 and links 22, whereby the ends of levers A and A' are raised and lowered. Lateral operation, for bringing the ends to be welded together, is accomplished through single lever L as heretofore described. The electric current is communicated through jaws 2 and 3 for gripping the work, and any suitable electrical connection can be made with these parts. In the present structure, dotted lines show current connections with the transformer in the base of the machine.

By the toggle link mechanism for controlling upper jaws 2 we obtain quick and effective operation, the degree of pressure in any case being easily determined by eccentric sleeves 24. This is exceedingly important in electric welding, because in order to obtain uniform results there must be uniform contact of the work in the holding jaws. Otherwise, the current will seek out the lines of closest contact and flow unevenly through the stock at the welding juncture, heating and welding unevenly as this occurs.

The clamping blocks 2 and 3 usually are of copper and different blocks are used according to the shape of the stock to be welded.

The base B is hollow, as above described, and has an opening b at its top and rear and the current transformer T is contained within said base and to keep the same cool, is submerged in oil indicated in Fig. 2 at the right by O. It is to be stated in this connection that oil is employed because it is a better heat conductor than air, and hence has a higher cooling value and will better convey heat from the transformer to the wall of the base and thus keep the transformer at a lower state of temperature than would be possible if it were not immersed in what is substantially a cooling liquid.

A switch R is shown in Fig. 1, and as already stated, the current connections can be made as may be required by the machine.

What we claim is:—

1. In an electric welding machine, two lower work clamping and conducting jaws and two upper work clamping and conducting jaws, means carrying said upper jaws comprising pivoted arms in which said jaws are fixed, and means at the free ends of each of said arms adapted to raise and lower the same comprising rotatable cams and links connected with said arms.

2. In an electric welding machine, a set of lower clamping jaws and a set of movable upper clamping jaws, pivoted arms in the front ends of which said upper jaws are mounted, separate standards and eccentrically mounted shafts in said standards, and toggle links connecting said shafts with the front ends of said arms respectively.

3. In an electric welding machine, opposed jaws arranged in pairs, a standard corresponding to each pair and outwardly inclined from the other standard at its upper portion, shafts mounted in said standards, toggle links and levers to control the same mounted on the inner ends of said shafts respectively, and an arm corresponding to each standard pivoted at its rear end and engaged at its front end by one of said toggle link connections and having the corresponding upper clamping jaw fixed therein.

4. In an electric welding machine, a suitable base and two work clamping jaws mounted thereon, one of said jaws being laterally movable in respect to the other and a lever and support for said movable jaw to adjust the same laterally, in combination with a set of upper jaws corresponding to said lower jaws and separate means for operating the same comprising pivoted arms carrying said jaws and toggle links mechanism to operate said arms.

5. In an electric welding machine, a base and two work clamping jaws thereon, a laterally slidable table carrying one of said jaws and a lever adapted to operate said table, in combination with two standards, one of said standards fixed and the other mounted on said slidable table, arms between said standards pivoted at one end and having work clamping jaws fixed in their free ends, toggle link operating means for each arm mounted on each of said standards, and levers controlling said toggle links.

6. In an electric welding machine, a suitable base, a fixed work holding jaw and a fixed standard corresponding thereto mounted on said base, a laterally movable table and a work holding jaw and a standard mounted thereon and a lever and link for operating said table, in combination with a pair of arms between said standards pivoted at one end and carrying work holding jaws in the other end, an eccentrically mounted shaft in each standard and toggle links mounted on the inner ends of said shafts and connected with said arms, and levers to operate said links, one of said arms being supported on the said laterally movable table.

7. In an electric welding machine, a set of lower work clamping jaws and a set of corresponding upper jaws, arms in which said upper jaws are mounted, pivot posts supporting said arms at one end and means to adjust said posts to fix the said jaws in exact working position.

8. In an electric welding machine, the combination of upper and lower work holding jaws in pairs, standards having overhanging heads and an eccentrically mounted shaft in each head, a pivoted arm next inside each shaft having one of said upper jaws fixed in its bottom and end and a lever controlled toggle link mechanism supporting each arm from the corresponding shaft.

9. An electric welding machine comprising two standards set at an inclination to each other laterally and relatively nearest at their bases, said standards having front overhanging portions, in combination with arms pivotally mounted between said standards and inclined to correspond therewith, means to control said arms engaged in the front overhanging portions of said standards, and an electrical conducting jaw in the free end of each of said arms.

In testimony whereof we sign this specification in the presence of two witnesses.

WILLIAM C. WINFIELD.
ALBERTIS C. TAYLOR.

Witnesses:
ALPHA WOOD,
M. J. SLOAN.